(12) United States Patent
Zhao et al.

(10) Patent No.: US 10,983,596 B2
(45) Date of Patent: Apr. 20, 2021

(54) GESTURE RECOGNITION METHOD, DEVICE, ELECTRONIC DEVICE, AND STORAGE MEDIUM

(71) Applicant: BEIJING BAIDU NETCOM SCIENCE AND TECHNOLOGY CO., LTD., Beijing (CN)

(72) Inventors: Chen Zhao, Beijing (CN); Shaoxiong Yang, Beijing (CN); Yuan Gao, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/791,128

(22) Filed: Feb. 14, 2020

(65) Prior Publication Data

US 2020/0301514 A1  Sep. 24, 2020

(30) Foreign Application Priority Data

Mar. 19, 2019 (CN) .......................... 201910210038.4

(51) Int. Cl.
*G06F 3/01* (2006.01)
*G06T 7/70* (2017.01)
(Continued)

(52) U.S. Cl.
CPC .............. *G06F 3/017* (2013.01); *G06F 17/16* (2013.01); *G06F 17/18* (2013.01); *G06N 3/0472* (2013.01);
(Continued)

(58) Field of Classification Search
CPC ............. G06T 7/70; G06T 2207/20081; G06T 2207/20084; G06F 3/017; G06F 17/16;
(Continued)

(56) References Cited

U.S. PATENT DOCUMENTS

2013/0088422 A1* 4/2013 Niikura ................... G06F 3/017
  345/156
2015/0370472 A1* 12/2015 Privault ................... G06F 3/017
  715/769

(Continued)

FOREIGN PATENT DOCUMENTS

CN    103413080 A    11/2013
CN    106055091 A    10/2016
(Continued)

OTHER PUBLICATIONS

Chinese Patent Application No. 201910210038.4, First Office Action dated Sep. 1, 2020, 8 pages.
(Continued)

*Primary Examiner* — Muhammad N Edun
(74) *Attorney, Agent, or Firm* — Lathrop GPM LLP

(57) ABSTRACT

The present disclosure provides a gesture recognition method, a device, an electronic device, and a storage medium. The method includes: sequentially performing a recognition process on each image from a target video using a preset recognition model of palm orientation to determine a probability of containing a palm image in each image and a palm normal vector corresponding to each image; determining a group of target images from the target video based on the probability of containing the palm image in each image; and determining a target gesture corresponding to the target video based on the palm normal vector corresponding to each target image in the group of target images.

15 Claims, 2 Drawing Sheets sequentially performing a recognition process on each image from a target video using a preset recognition model of palm orientation to determine a probability of containing a palm image in each image and a palm normal vector corresponding to each image — 101 determining a group of target images from the target video based on the probability of containing the palm image in each image — 102 determining a target gesture corresponding to the target video based on the palm normal vector corresponding to each target image in the group of target images — 103

(51) Int. Cl.
  *G06F 17/16* (2006.01)
  *G06F 17/18* (2006.01)
  *G06N 3/04* (2006.01)

(52) U.S. Cl.
  CPC ...... *G06T 7/70* (2017.01); *G06T 2207/20081* (2013.01); *G06T 2207/20084* (2013.01)

(58) Field of Classification Search
  CPC .. G06F 17/18; G06K 9/00355; G06K 9/6273; G06K 9/4628; G06N 3/0472
  See application file for complete search history.

(56) References Cited

U.S. PATENT DOCUMENTS

| | | | |
|---|---|---|---|
| 2017/0045952 A1* | 2/2017 | Zhang | G06K 9/00355 |
| 2017/0068416 A1* | 3/2017 | Li | G06F 3/04812 |
| 2018/0307319 A1* | 10/2018 | Karmon | G06K 9/00389 |
| 2019/0005309 A1 | 1/2019 | Hyun et al. | |
| 2020/0311453 A1* | 10/2020 | Li | G06K 9/629 |

FOREIGN PATENT DOCUMENTS

| | | |
|---|---|---|
| CN | 108131808 A | 6/2018 |
| CN | 108520247 A | 9/2018 |
| CN | 109284698 A | 1/2019 |
| KR | 20100014092 A | 2/2010 |

OTHER PUBLICATIONS

Chinese Patent Application No. 201910210038.4, English translation of First Office Action dated Sep. 1, 2020, 10 pages.
European Patent Application No. 20157174.2, extended Search and Opinion dated Aug. 11, 2020, 11 pages.
Asad, M,. et al. "SPORE:staged probabilistic regression for hand orientation inference" Computer Vision and Image Understanding May 22, 2017; pp. 1-16.
Bao, P. et al. "Tiny Hand Gesture Recognition without Localization via a Deep Convolutional Network", IEEE Transactions on Consumer Electronics, vol. 63, No. 3, Aug. 2017, pp. 251-257.
Molchanov, P. et al. "Online Detection and Classification of Dynamic Hand Gestures with Recurrent 3d Convolutional Neural Networks" IEEE Conference on Computer Vision and Pattern Recognition, Jun. 27, 2016, pp. 4207-4215.
Korean Patent Application No. 10-2020-0019007, Office Action dated Feb. 24, 2021, 5 pages.
Korean Patent Application No. 10-2020-0019007, English translation of Office Action dated Feb. 24, 2021, 4 pages.

* cited by examiner

US 10,983,596 B2

GESTURE RECOGNITION METHOD, DEVICE, ELECTRONIC DEVICE, AND STORAGE MEDIUM

CROSS REFERENCE TO RELATED APPLICATION

This application claims priority and benefits to Chinese Application No. 201910210038.4, filed on Mar. 19, 2019, the entire content of which is incorporated herein by reference.

TECHNICAL FIELD

The present disclosure relates to a field of human-computer interactive technologies, and more particularly, to a gesture recognition method, a gesture recognition device, an electronic device, and a storage medium.

BACKGROUND

The rapid development of computer technology has brought convenience to people in all walks of life, and a close relationship between people and computers has been established, in which the information interaction is essential. Vision-based human-computer interaction has become the leading technology in the field of human-computer interaction.

SUMMARY

Embodiments of the present disclosure provide a gesture recognition method. The gesture recognition method includes: sequentially performing a recognition process on each image of a target video using a preset recognition model of a palm orientation, and determining a probability of containing a palm image in each image and a palm normal vector corresponding to each image; determining a group of target images from the target video based on the probability of containing the palm image in each image; and determining a target gesture corresponding to the target video based on the palm normal vector corresponding to each target image in the group of target images.

Embodiments of the present disclosure provide an electronic device. The electronic device includes a processor and a memory. The processor is configured to run programs corresponding to executable program codes by reading the executable program codes stored in the memory, such that the above gesture recognition method may be implemented.

Embodiments of the present disclosure provide a computer readable storage medium having a computer program stored thereon. When the program is executed by a processor, the above gesture recognition method may be implemented.

Additional aspects and advantages of embodiments of the present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions made with reference to the drawings, in which.

DETAILED DESCRIPTION

Figure 1:
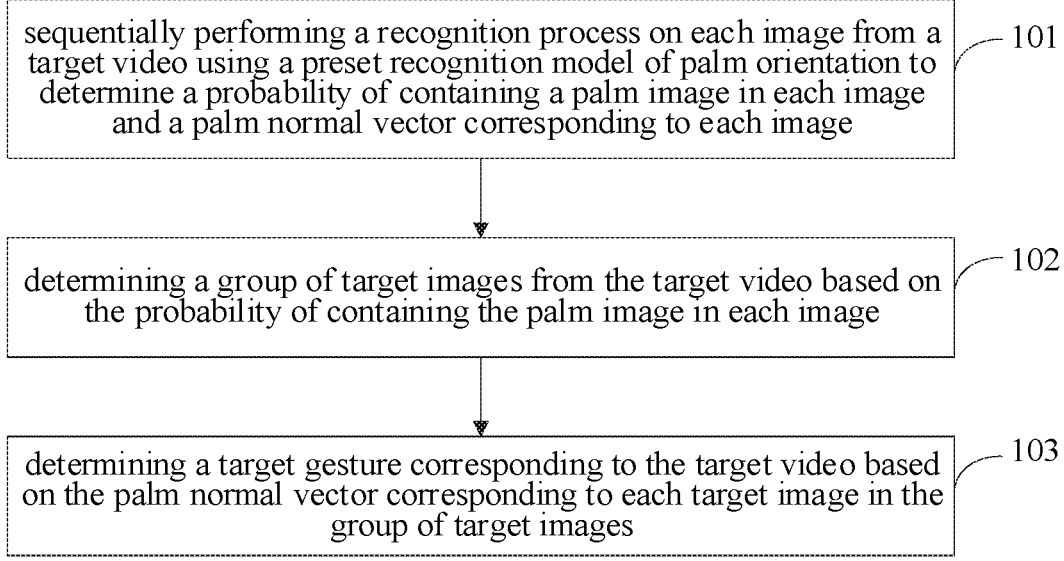
FIG. 1 is a flowchart illustrating a gesture recognition method according to embodiments of the present disclosure.

Embodiments of the present disclosure will be described in detail and examples of embodiments are illustrated in the drawings. The same or similar elements and the elements having the same or similar functions are denoted by like reference numerals throughout the descriptions. Embodiments described herein with reference to drawings are explanatory, serve to explain the present disclosure, and are not construed to limit embodiments of the present disclosure.

In the related art, the human-computer interaction may be mainly performed by gesture recognition. An existing gesture recognition method mostly determine a gesture by detecting a 3D position of a key point of the gesture in the image. However, due to multiple influencing factors, such as self-blocking of the hand, multi-freedom, and a significant difference of the same gesture made by different people in different environments, the existing gesture recognition method may have a complex algorithm and a low recognition speed.

Therefore, the present disclosure provides a gesture recognition method, a gesture recognition device, an electronic device, and a storage medium for solving a problem of complex algorithm and slow recognition speed in the existing method for determining a gesture by detecting the 3D position of the key point of the gesture.

FIG. 1 is a flowchart illustrating a gesture recognition method according to embodiments of the present disclosure.

The gesture recognition method according to embodiments of the present disclosure may be executed by a gesture recognition device according to embodiments of the present disclosure. The device may be integrated in an electronic device, such as a mobile phone, a smart TV or the like. A palm normal vector may be directly output using a preset recognition model of palm orientation to further determine the gesture, thereby having a simple algorithm and a high recognition speed.

As illustrated in FIG. 1, the gesture recognition method may include the following.

At block 101, a recognition process is performed on each image from a target video sequentially using a preset recognition model of palm orientation to determine a probability of containing a palm image in each image and a palm normal vector corresponding to each image.

In practical applications, multiple images may be captured by a camera device. The multiple images may be used as the target video. That is, the target video may be the captured continuous multiple images.

In embodiments, the preset recognition model of gesture orientation may have tow outputs. One is to output a probability of a palm gesture by a binary classifier, and the other is to output three values, i.e., x, y, and z values in an X-axis, a Y-axis and a Z axis in a rectangular coordinate system respectively, to obtain the palm normal vector (x, y, z).

In detail, each frame from the target video may be sequentially input into the preset recognition model of palm orientation. Each image may be recognized by the preset recognition model of palm orientation to output the probability of containing the palm image in each image and the palm normal vector corresponding to each image.

The palm normal vector may be a vector perpendicular to a palm plane. The orientation of the palm may be determined based on a direction of the palm normal vector. For example, in response to detecting that the direction of the palm normal vector is vertically upward, it may be determined that the palm is faced upwards.

In order to improve recognition efficiency, before the recognition process is performed on each image from the target video using the preset recognition model of gesture orientation, images from the target video may be filtered to remove invalid images. For example, an image that does not contain a human body may be deleted.

In related arts, the method for recognizing a gesture using the 3D key points of the palm is to detect the 3D key points of the palm in the image and to determine the palm normal vector based on the detected 3D key points. In embodiments, the palm normal vector may be directly determined using the preset recognition model of palm orientation, which is simple.

At block 102, a group of target images may be determined from the target video based on the probability of containing the palm image in each image.

In practical applications, the captured image may not include the hand due to changes in the gesture of the user, i.e., no hand may be included in some images from the target video for determining the gesture. Therefore, embodiments of the present disclosure may determine the group of target images from the target video by judging each image from the target video based on the probability of containing the palm image in each image.

In detail, the probability of containing the palm image in each image from the target video may be compared with a preset threshold. In response to detecting that the probability of containing the palm image in a first image is greater than or equal to the preset threshold, the first image may be determined as an image included in the group of target images. It may be seen that, the image included in the group of target images has a relatively high probability of containing the palm image.

For illustration purposes, in embodiments, the image having the probability of containing the palm image greater than or equal to the preset threshold may be referred to as the first image. That is, the first image refers to an image, from the target video, having the probability of containing the palm image greater than or equal to the preset threshold.

In embodiments, by screening the image with a lower probability of containing a palm according to the probability of the each image in the target video containing a palm, images with a higher probability of containing a palm is obtained to form the target image group, which improves the accuracy of gesture recognition.

At step 103, a target gesture corresponding to the target video is determined based on the palm normal vector corresponding to each target image in the group of target images.

An orientation of the palm may be determined for each image based on the palm normal vector corresponding to each image. Therefore, a change in the orientation of the palm may be determined based on the orientation of the palm in each target image included in the group of target images. The gesture corresponding to the target video may be determined based on the change in the orientation of the palm, which is referred to herein as the target gesture.

In embodiments, determining the gesture using the group of target images that is determined based on the probability of containing the palm image in each image has an improved accuracy of gesture recognition, compared to a method for determining the gesture using the target video.

With the gesture recognition method according to embodiments of the present disclosure, the recognition process may be performed on each image from the target video sequentially using the preset recognition model of palm orientation to obtain the probability of containing the palm image in each image and the palm normal vector corresponding to each image. The group of target images may be determined based on the probability of containing the palm image in each image. The target gesture corresponding to the target video may be determined based on the palm normal vector corresponding to each target image in the group of target images. Therefore, the palm normal vector may be directly output using the preset recognition model of palm orientation to further determine the gesture, thereby having a simple algorithm is simple and a high recognition speed.

Figure 2:
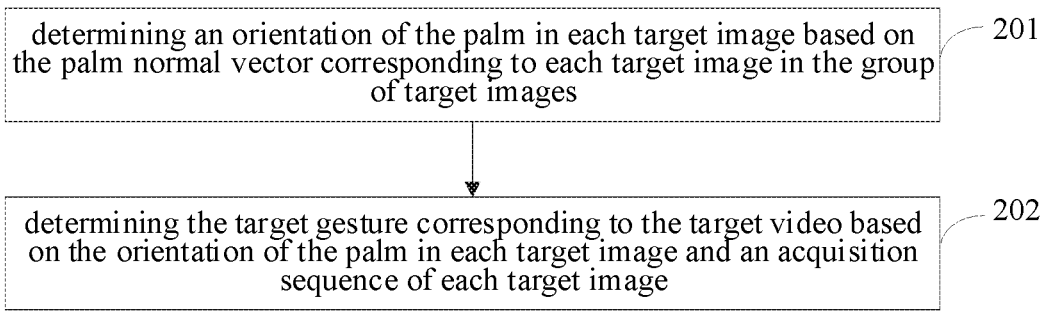
FIG. 2 is a flowchart illustrating a method for determining a target gesture corresponding to a target video according to embodiments of the present disclosure.

In embodiments, the target gesture may be determined by the method illustrated in FIG. 2. FIG. 2 is a flowchart illustrating a method for determining a target gesture corresponding to a target video according to embodiments of the present disclosure.

As illustrated in FIG. 2, determining the target gesture corresponding to the target video based on the palm normal vector corresponding to each target image in the group of target images may include the following.

At block 201, an orientation of the palm in each target image is determined based on the palm normal vector corresponding to each target image in the group of target images.

Since the palm normal vector may indicate a current orientation of the palm, the orientation of the palm in each image may be determined based on the palm normal vector corresponding to each target image in the group of target images.

For example, if the palm normal vector is vertically downward, it may be determined that the orientation of the palm is faced downwards.

At block 202, the target gesture corresponding to the target video may be determined based on the orientation of the palm in each target image and an acquisition sequence of each target image.

Since motion of the user is continuous, the change of the orientation of the palm during the target video may be determined based on the acquisition sequence of each target image in the group of target images and the orientation of the palm in each target image, to determine the target gesture corresponding to the target video.

In embodiments, the orientation of the palm in each target image may be determined based on the palm normal vector corresponding to each target image in the group of target images. The target gesture corresponding to the target video may be determined based on the orientation of the palm in each target image and the acquisition sequence of each target image.

Figure 3:
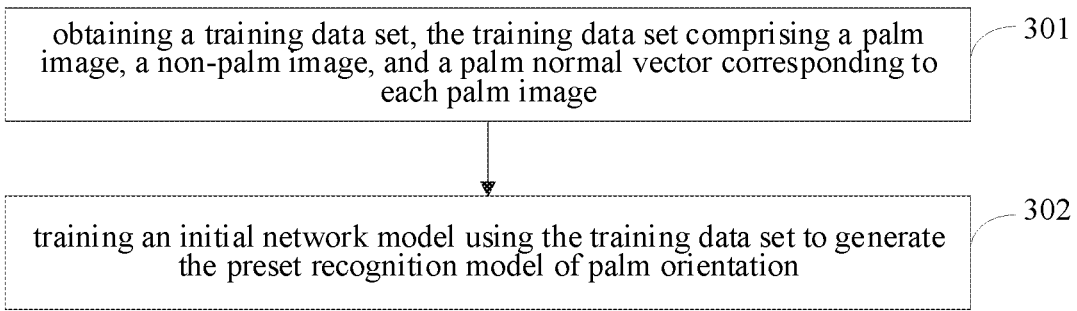
FIG. 3 is a flowchart illustrating a method for training a preset recognition model of gesture orientation according to embodiments of the present disclosure.

In an actual application, before using the preset recognition model of gesture orientation to perform the recognition process on each image from the target video, the preset recognition model of gesture orientation may be obtained through training. As illustrated in FIG. 3, FIG. 3 is a flowchart illustrating a method for training a preset recognition model of gesture orientation according to embodiments of the present disclosure.

As illustrated in FIG. 3, the method may include the following.

At block 301, a training data set is obtained. The training data set may include a palm image, a non-palm image, and a palm normal vector corresponding to each palm image.

In embodiments, a large number of palm images and multiple non-palm images (i.e., images that do not contain a palm) may be acquired. The palm images and non-palm images may be labeled.

The labelling contains two parts, i.e., labelling a gesture category and labelling a palm normal vector.

There are two types of gesture categories, i.e., palm gesture and non-palm gesture. Therefore, each palm image may be labeled as the palm gesture, while each non-palm image may be labeled as the non-palm gesture.

For labelling of the palm normal vector, the palm normal vector may be estimated based on the orientation of the gesture. In an example, the palm normal vector may be labelled with an open-source and enhanced ARSDK (augmented reality software development kit), such as ARTool-Kit.

The ARToolKit is an open-source ARSDK that may solve internal and external parameters of the camera in real time. In detail, a label may be created. The created label may be attached to the palm and may be tracked using the ARToolKit. The ARToolKit may obtain a rotation and translation matrix (also called as RT matrix) (i.e., Post Matrix) of two sets of feature points by matching the feature points. The 3D orientation (i.e., the palm normal vector) of the palm gesture may be obtained.

In the related art, in the gesture recognition method by detecting the 3D key points of the palm in the image, it is necessary to label a large number of 3D key points of the palm such that a difficulty of labelling the 3D key points is large and an error of labelling easily occurs. In embodiments, it only requires to label the gesture category and the palm normal vector of the obtained palm images and the obtained non-palm images. Compared with labeling the 3D key points of the palm, a difficulty of labelling is small and a task of labelling is simple.

At block 302, an initial network model is trained using the training data set to generate the preset recognition model of palm orientation.

In embodiments, the initial network model may be a convolutional neural network. The initial network model has two outputs. One is to output a probability of containing the palm image in the image, and the other is to output three values, i.e., the palm normal vector (x, y, z).

In detail, the initial network model may be trained using images in the training data set. Parameters of the initial network model may be continuously adjusted through an iterative training until a loss function of the initial network model is not decreased to obtain the preset recognition model of palm orientation.

After the preset recognition model of palm orientation is obtained, the target recognition model of palm orientation may be used to determine the target gesture corresponding to the target video.

In embodiments, the initial network model may be trained using the training data set including the palm image, the non-palm image, and the palm normal vector corresponding to each palm image to obtain the preset recognition model of gesture orientation. It only requires to label the gesture category and the palm normal vector during labelling the images of the training data set, such that the difficulty of labelling is small compared with labelling the 3D key points of the palm. In addition, determining the gesture based on the preset recognition model of gesture orientation has high accuracy.

A plane may have any amount of normal vectors. In order to simplify data labeling and model processing, it is possible to label a unit normal vector of the palm only.

In detail, after the training data set is acquired, the palm normal vector of each palm image may be normalized to obtain the unit normal vector of each palm image. The normalization of the palm normal vectors (x, y, z) may be performed according to equation (1) as follows.

$$(x_0, y_0, z_0) = \left( \frac{x_0}{\sqrt{x^2 + y^2 + z^2}}, \frac{y_0}{\sqrt{x^2 + y^2 + z^2}}, \frac{z_0}{\sqrt{x^2 + y^2 + z^2}} \right) \quad (1)$$

Where, $(x_0, y_0, z_0)$ is the unit normal vector of the palm normal vector (x, y, z).

In embodiments, after the training data set is obtained, the palm normal vectors of each palm image are normalized to obtain the unit normal vector. For each palm image, only the unit normal vector is labelled, such that the labeling may be simplified and processing amount may be reduced.

In the field of human-computer interaction, the gesture may be used to control a device. In some embodiments of the present disclosure, after the target gesture corresponding to the target video is determined, the target gesture may be compared with a preset gesture. There may be one preset gesture or more preset gesture. Each gesture corresponds to a different control command.

During the matching, it may be determined whether the target gesture matches the preset gesture based on a determination whether a changing process of the target gesture is consistent to a changing process of the preset gesture. In response to determining that the target gesture matches any of the one or more preset gestures, an electronic device may be controlled based on a control command corresponding to the preset gesture.

For example, the preset gesture "the palm is turned-over from facing upwards to facing downwards" corresponds to the control command to turn off the smart TV. In response to detecting that the target gesture matches the preset gesture, the smart TV is controlled to be turned off.

In embodiments, after the gesture corresponding to the target video is determined, in response to detecting that the target gesture is matched with any of the one or more preset gestures, the electronic device may be controlled based on a control command corresponding to the preset gesture, thereby realizing the human-computer interaction with the target gesture.

Figure 4:
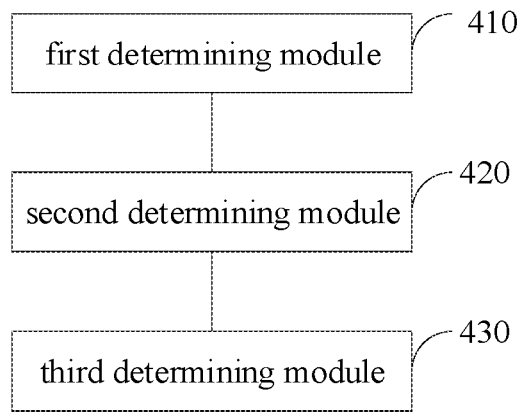
FIG. 4 is a block diagram illustrating a gesture recognition device according to embodiments of the present disclosure.

In order to implement the above embodiments, embodiments of the present disclosure further provide a gesture recognition device. FIG. 4 is a block diagram illustrating a gesture recognition device according to embodiments of the present disclosure.

As illustrated in FIG. 4, the gesture recognition device may include a first determining module 410, a second determining module 420, and a third determining module 430.

The first determining module 410 may be configured to perform a recognition process sequentially on each image from a target video using a preset recognition model of palm orientation to determine a probability of containing a palm image in each image and a palm normal vector corresponding to each image.

The second determining module 420 may be configured to determine a group of target images from the target video based on the probability of containing the palm image in each image.

The third determining module 430 may be configured to determine a target gesture corresponding to the target video based on the palm normal vector of each target image in the group of target images.

In a possible implementation, the second determining module 420 is configured to, in response to detecting that the probability of containing the palm image in a first image is greater than or equal to a preset threshold, determine the first image as an image included in the group of target images.

In a possible implementation, the third determining module 430 may be configured to determine an orientation of the palm in each target image based on the palm normal vector corresponding to each target image included in the group of target images; and determine the target gesture corresponding to the target video based on the orientation of the palm in each target image and an acquisition sequence of each target image.

In a possible implementation, a preset recognition model of palm orientation may be trained by an obtaining module and a training module. The obtaining module may be configured to obtain a training data set. The training data set include a palm image, a non-palm image, and a palm normal vector corresponding to each palm image. The training module may be configured to train an initial network model using the training data set to generate the preset recognition model of palm orientation.

In a possible implementation, modules for training the preset recognition model of palm orientation may include a fourth determining module. The fourth determining module may be configured to normalize the palm normal vector corresponding to each palm image to determine a unit normal vector corresponding to each palm image.

In a possible implementation, the device further includes a control module. The control module may be configured to, in response to detecting that the target gesture matches any of one or more preset gestures, control an electronic device based on a control command corresponding the preset gesture.

It should be noted that the above description of the embodiments of the gesture recognition method is also applicable to the gesture recognition device of the embodiment, and thus is not described herein again.

With the gesture recognition device according to embodiments of the present disclosure, the recognition process may be performed on each image from the target video sequentially using a preset recognition model of the palm orientation. A probability of containing the palm image in each image and a palm normal vector corresponding to each image may be determined. A group of target images may be determined from the target video based on the probability of containing the palm image in each image. The target gesture corresponding to the target video may be determined based on the palm normal vector corresponding to each target image in the group of target images. Therefore, the palm normal vector may be directly output using the preset recognition model of the palm orientation to further determine gesture, thereby having a simple algorithm and a high recognition speed.

In order to realize the above embodiments, embodiments further provide an electronic device. The electronic device includes a processor and a memory. The processor is configured to run a program corresponding to an executable program code by reading the executable program code stored in the memory, such that the gesture recognition method according to the embodiments may be implemented.

Figure 5:
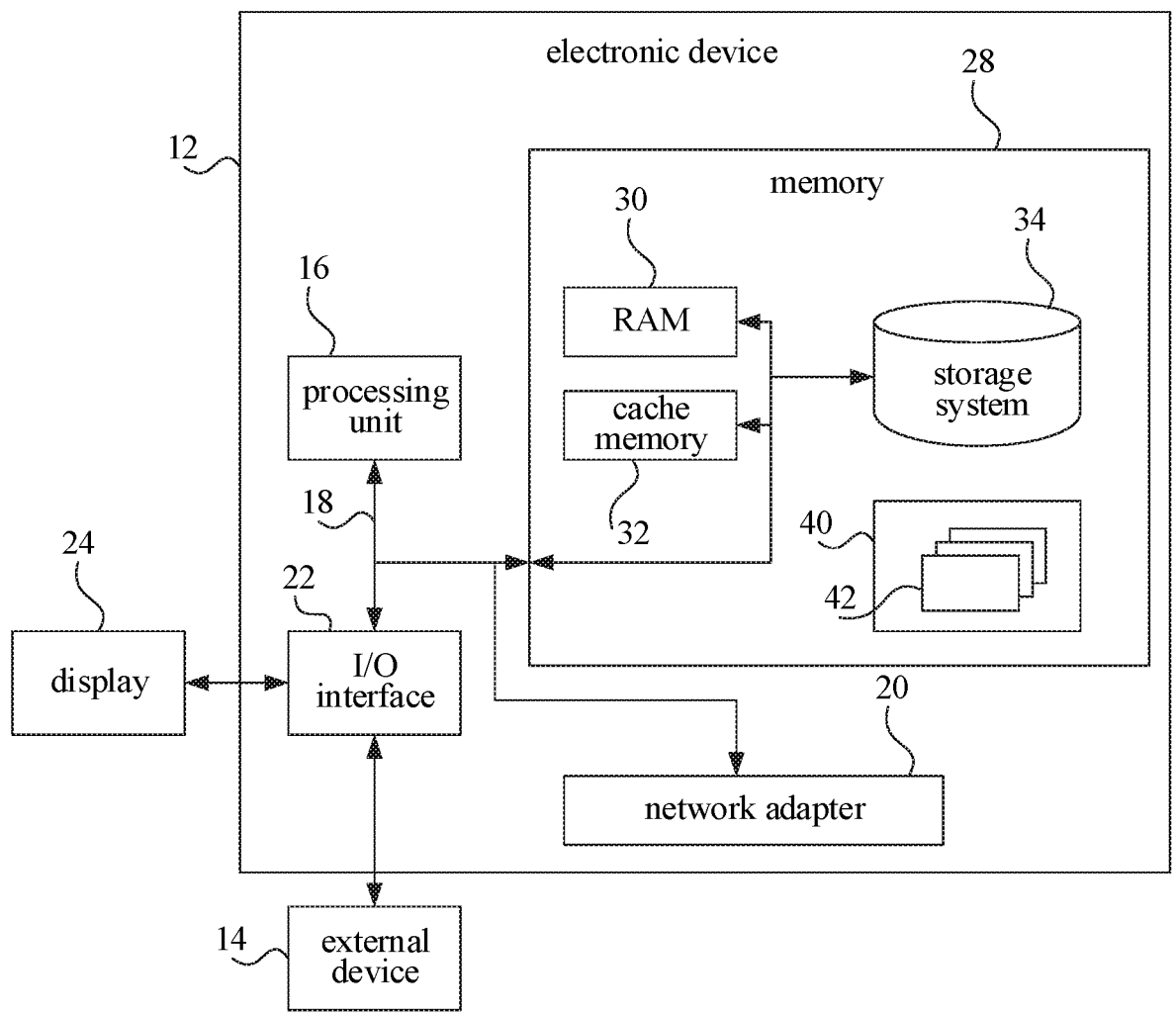
FIG. 5 is a block diagram illustrating an exemplary electronic device suitable for implementing embodiments of the present disclosure.

FIG. 5 is a block diagram illustrating an exemplary electronic device suitable for implementing embodiments of the present disclosure. The electronic device 12 illustrated in FIG. 5 is merely an example and should not impose any limitation on the function and scope of use of the embodiments of the present disclosure.

As illustrated in FIG. 5, the computer device 12 may be represented via a general computer device form. Components of the computer device 12 may include but be not limited to one or more processors or processing units 16, a system memory 28, a bus 18 connecting various system components including the system memory 28 and the processing units 16.

The bus 18 represents one or more of several types of bus structures, including a memory bus or a memory controller, a peripheral bus, a graphics acceleration port, a processor, or a local bus using any of a variety of bus structures. For example, these architectures include, but are not limited to, an Industry Standard Architecture (hereinafter referred to as ISA) bus, a Micro Channel Architecture (hereinafter referred to as MAC) bus, an enhanced ISA bus, a Video Electronics Standards Association (hereinafter referred to as VESA) local bus and Peripheral Component Interconnection (PCI) bus.

The computer device 12 typically includes a variety of computer system readable media. These media may be any available media accessible by the computer device 12 and includes both volatile and non-volatile media, removable and non-removable media.

The system memory 28 may include a computer system readable medium in the form of volatile memory, such as a random access memory (hereinafter referred to as RAM) 30 and/or a high speed cache memory 32. The computer device 12 may further include other removable or non-removable, volatile or non-volatile computer system storage media. By way of example only, the storage system 34 may be configured to read and write a non-removable and non-volatile magnetic media (not shown in FIG. 5, commonly referred to as a "hard drive"). Although not shown in FIG. 5, a magnetic disk driver for reading from and writing to a removable and non-volatile magnetic disk (such as "floppy disk") and a disk driver for a removable and non-volatile optical disk (such as compact disk read only memory (hereinafter referred to as CD-ROM), Digital Video Disc Read Only Memory (hereinafter referred to as DVD-ROM) or other optical media) may be provided. In these cases, each driver may be connected to the bus 18 via one or more data medium interfaces. The memory 28 may include at least one program product. The program product has a set (such as, at least one) of program modules configured to perform the functions of various embodiments of the present disclosure.

A program/utility 40 having a set (at least one) of the program modules 42 may be stored in, for example, the memory 28. The program modules 42 include but are not limited to, an operating system, one or more application programs, other programs modules, and program data. Each of these examples, or some combination thereof, may include an implementation of a network environment. The program modules 42 generally perform the functions and/or methods in the embodiments described herein.

The computer device 12 may also communicate with one or more external devices 14 (such as, a keyboard, a pointing device, a display 24, etc.). Furthermore, the computer device 12 may also communicate with one or more communication devices enabling a user to interact with the computer device 12 and/or other devices (such as a network card, modem, etc.) enabling the computer device 12 to communicate with one or more computer devices. This communication can be performed via the input/output (I/O) interface 22. Also, the computer device 12 may communicate with one or more networks (such as a local area network (hereafter referred to as LAN), a wide area network (hereafter referred to as WAN) and/or a public network such as an Internet) through a network adapter 20. As shown, the network adapter 20 communicates with other modules of the computer device 12 over the bus 18. It should be understood that, although not shown, other hardware and/or software modules may be used in connection with the computer device 12. The hardware and/or software includes, but is not limited to, microcode, device drivers, redundant processing units, external disk drive arrays, RAID systems, tap Drive and data backup storage system.

The processing unit 16 is configured to execute various functional applications and data processing by running programs stored in the system memory 28, for example, implementing the method provided in embodiments of the present disclosure.

Embodiments of the present disclosure provide a computer readable storage medium having a computer program stored thereon, wherein when the program is executed by a processor, the gesture recognition method according to the embodiments is implemented.

It should be illustrated that, in descriptions of the present disclosure, terms such as "first" and "second" are used herein for purposes of description and are not construed as indicating or implying relative importance or significance. Furthermore, in the description of the present disclosure, "a plurality of" means two or more than two, unless specified otherwise.

Any procedure or method described in the flow charts or described in any other way herein may be understood to comprise one or more modules, portions or parts for storing executable codes that realize particular logic functions or procedures. Moreover, advantageous embodiments of the present disclosure comprise other implementations in which the order of execution is different from that which is depicted or discussed, including executing functions in a substantially simultaneous manner or in an opposite order according to the related functions, which should be understood by those skilled in the art. The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks or CD, etc. Although explanatory embodiments have been illustrated and described, it would be appreciated by those skilled in the art that the above embodiments are exemplary and cannot be construed to limit the present disclosure, and changes, modifications, alternatives and varieties can be made in the embodiments by those skilled in the art without departing from scope of the present disclosure.

What is claimed is:

1. A gesture recognition method, comprising:
    sequentially performing a recognition process on each image from a target video using a preset recognition model of palm orientation to determine a probability of containing a palm image in each image and a palm normal vector corresponding to each image;
    determining a group of target images from the target video based on the probability of containing the palm image in each image;
    determining a target gesture corresponding to the target video based on the palm normal vector corresponding to each target image in the group of target images; and
    training the preset recognition model of palm orientation by: obtaining a training data set, the training data set comprising a palm image, a non-palm image, and a palm normal vector corresponding to each palm image; and training an initial network model using the training data set to generate the preset recognition model of palm orientation.

2. The method of claim 1, wherein determining the group of target images from the target video based on the probability of containing the palm image in each image comprises:
in response to detecting that the probability of containing the palm image in a first image is greater than or equal to a preset threshold, determining the first image as an image in the group of target images.

3. The method of claim 1, wherein determining the target gesture corresponding to the target video based on the palm normal vector corresponding to each target image in the group of target images comprises:
determining an orientation of the palm in each target image based on the palm normal vector corresponding to each target image in the group of target images; and
determining the target gesture corresponding to the target video based on the orientation of the palm in each target image and an acquisition sequence of each target image.

4. The method of claim 1, further comprising:
normalizing the palm normal vector of each palm image to obtain a unit normal vector of each palm image.

5. The method of claim 1, further comprising:
in response to determining that the target gesture matches a first preset gesture of one or more preset gestures, controlling an electronic device based on a control command corresponding the first preset gesture.

6. An electronic device, comprising a processor and a memory, wherein the processor runs a program corresponding to an executable program code by reading the executable program code stored in the memory, such that the processor is configured to:
sequentially perform a recognition process on each image from a target video using a preset recognition model of palm orientation to determine a probability of containing a palm image in each image and a palm normal vector corresponding to each image;
determine a group of target images from the target video based on the probability of containing the palm image in each image; and
determine a target gesture corresponding to the target video based on the palm normal vector corresponding to each target image in the group of target images;
wherein the processor is further configured to train the preset recognition model of palm orientation by: obtaining a training data set, the training data set comprising a palm image, a non-palm image, and a palm normal vector corresponding to each palm image; and training an initial network model using the training data set to generate the preset recognition model of palm orientation.

7. The electronic device of claim 6, wherein the processor is configured to determine the group of target images from the target video based on the probability of containing the palm image in each image by:
in response to detecting that the probability of containing the palm image in a first image is greater than or equal to a preset threshold, determining the first image as an image in the group of target images.

8. The electronic device of claim 6, wherein the processor is configured to determine the target gesture corresponding to the target video based on the palm normal vector corresponding to each target image in the group of target images by:
determining an orientation of the palm in each target image based on the palm normal vector corresponding to each target image in the group of target images; and
determining the target gesture corresponding to the target video based on the orientation of the palm in each target image and an acquisition sequence of each target image.

9. The electronic device of claim 6, wherein the processor is configured to:
normalize the palm normal vector of each palm image to obtain a unit normal vector of each palm image.

10. The electronic device of claim 6, wherein the processor is further configured to:
in response to determining that the target gesture matches a first preset gesture of one or more preset gestures, control an electronic device based on a control command corresponding the first preset gesture.

11. A non-transitory computer readable storage medium having a computer program stored thereon, wherein when the program is executed by a processor, the gesture recognition method is implemented, the method comprising:
sequentially performing a recognition process on each image from a target video using a preset recognition model of palm orientation to determine a probability of containing a palm image in each image and a palm normal vector corresponding to each image;
determining a group of target images from the target video based on the probability of containing the palm image in each image;
determining a target gesture corresponding to the target video based on the palm normal vector corresponding to each target image in the group of target images;
training the preset recognition model of palm orientation by: obtaining a training data set, the training data set comprising a palm image, a non-palm image, and a palm normal vector corresponding to each palm image; and training an initial network model using the training data set to generate the preset recognition model of palm orientation.

12. The non-transitory computer readable storage medium of claim 11, wherein determining the group of target images from the target video based on the probability of containing the palm image in each image comprises:
in response to detecting that the probability of containing the palm image in a first image is greater than or equal to a preset threshold, determining the first image as an image in the group of target images.

13. The non-transitory computer readable storage medium of claim 11, wherein determining the target gesture corresponding to the target video based on the palm normal vector corresponding to each target image in the group of target images comprises:
determining an orientation of the palm in each target image based on the palm normal vector corresponding to each target image in the group of target images; and
determining the target gesture corresponding to the target video based on the orientation of the palm in each target image and an acquisition sequence of each target image.

14. The non-transitory computer readable storage medium of claim 11, wherein the method further comprises:
normalizing the palm normal vector of each palm image to obtain a unit normal vector of each palm image.

15. The non-transitory computer readable storage medium of claim 11, wherein the method further comprises:
in response to determining that the target gesture matches a first preset gesture of one or more preset gestures, controlling an electronic device based on a control command corresponding the first preset gesture.

* * * * *